(12) United States Patent
Barsukov

(10) Patent No.: US 10,707,689 B2
(45) Date of Patent: *Jul. 7, 2020

(54) BATTERY CHARGER

(71) Applicant: Texas Instruments Incorporated, Dallas, TX (US)

(72) Inventor: Yevgen Barsukov, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/026,222

(22) Filed: Jul. 3, 2018

(65) Prior Publication Data
US 2019/0013689 A1 Jan. 10, 2019

Related U.S. Application Data

(63) Continuation of application No. 13/790,966, filed on Mar. 8, 2013, now Pat. No. 10,044,214.

(51) Int. Cl.
H02J 7/00 (2006.01)

(52) U.S. Cl.
CPC .............................. *H02J 7/007184* (2020.01)

(58) Field of Classification Search
CPC .............. B60L 11/1838; B60L 11/1851; B60L 11/1861; B60L 11/1862; B60L 2260/58; H02J 7/0081; H02J 7/007; H02J 7/00
USPC ................................................. 320/109, 112
See application file for complete search history.

(56) References Cited

U.S. PATENT DOCUMENTS

| 4,742,290 | A |   | 5/1988  | Sutphin et al. |           |
|-----------|---|---|---------|----------------|-----------|
| 5,606,242 | A | * | 2/1997  | Hull ........... | H02J 7/0004 |
|           |   |   |         |                | 320/106   |
| 6,002,237 | A |   | 12/1999 | Gaza et al.    |           |
| 6,064,180 | A | * | 5/2000  | Sullivan ..... | B60L 58/10 |
|           |   |   |         |                | 320/132   |
| 6,072,299 | A | * | 6/2000  | Kurle ........ | A61N 1/3975 |
|           |   |   |         |                | 320/112   |
| 6,291,965 | B1| * | 9/2001  | Nagai ........ | H02J 7/0004 |
|           |   |   |         |                | 320/106   |
| 6,359,419 | B1| * | 3/2002  | Verbrugge ... | B60K 6/44 |
|           |   |   |         |                | 320/132   |

(Continued)

FOREIGN PATENT DOCUMENTS

CN    102055037 A    5/2011
JP    2012060813 A   3/2012

OTHER PUBLICATIONS

Search Report for PCT Application PCT/US14/22319, dated Jul. 10, 2014 (7 pages).

(Continued)

*Primary Examiner* — Richard Isla
*Assistant Examiner* — Dung V Bui
(74) *Attorney, Agent, or Firm* — Mark Allen Valetti; Charles A. Brill; Frank Cimino

(57) ABSTRACT

A battery charger can include a charger controller configured to determine a total charge time that characterizes a time needed to charge a battery, the total charge time being based on a received state of charge (SOC) of the battery that characterizes a present SOC of the battery. The charger controller can also be configured to determine a charging start time for the battery based on a predetermined full charge time and the total charge time.

20 Claims, 5 Drawing Sheets

(56) References Cited

U.S. PATENT DOCUMENTS

| | | |
|---|---|---|
| 6,459,237 B1 | 10/2002 | Bausch |
| 6,605,926 B2 | 8/2003 | Crisp et al. |
| 8,148,951 B2 | 4/2012 | Saito |
| 10,044,214 B2* | 8/2018 | Barsukov .............. H02J 7/0081 |
| 2001/0022158 A1 | 9/2001 | Asakura et al. |
| 2001/0022518 A1* | 9/2001 | Asakura .................. H02M 3/07 |
| | | 324/426 |
| 2004/0066171 A1* | 4/2004 | Mori ....................... G06F 1/263 |
| | | 320/132 |
| 2004/0160215 A1 | 8/2004 | Richter et al. |
| 2008/0191667 A1* | 8/2008 | Kernahan ............. H01M 10/44 |
| | | 320/150 |
| 2009/0243549 A1 | 10/2009 | Matsummura et al. |
| 2009/0302855 A1* | 12/2009 | Lin ......................... B60L 58/10 |
| | | 324/432 |
| 2010/0033138 A1* | 2/2010 | Alger .................... H02J 7/0073 |
| | | 320/153 |
| 2011/0006731 A1* | 1/2011 | Wang ..................... H02J 7/045 |
| | | 320/109 |
| 2011/0119005 A1* | 5/2011 | Majima ............... H01M 10/425 |
| | | 702/63 |
| 2012/0259723 A1* | 10/2012 | Ansari .................... H02J 3/008 |
| | | 705/26.3 |
| 2013/0002199 A1* | 1/2013 | Hu ........................ H02J 7/0004 |
| | | 320/112 |
| 2013/0147424 A1* | 6/2013 | Takano ............... H01M 10/443 |
| | | 320/107 |
| 2013/0221903 A1* | 8/2013 | Hwang .................. H02J 7/045 |
| | | 320/107 |
| 2014/0002025 A1* | 1/2014 | Yamamoto .......... H01M 10/443 |
| | | 320/109 |
| 2014/0253039 A1 | 9/2014 | Barsukov |

OTHER PUBLICATIONS

"A Guide to understanding Battery Specifications", MIT Electric Vehicle Team, Dec. 2008 (3 pages).

Lawrence B. Rees, "Lesson 6—Capacitors and Capacitance", 2007 (pp. 1-24).

Zhu Jianchao, "Test and Charging Method for PHEV Battery," Chinese Master's Theses, Full-text Database (Electronic Journal), 12, publication date Dec. 15, 2011 (pp. 1, 62-63, 68).

English Machine Translation, CN102055037A (10 pages).

English Machine Translation, JP2012060813A (10 pages).

State Intellectual Property Office of PRC, Notification of First Office Action for China Application No. 201480012910.X. dated Jul. 4, 2017 4 pages).

* cited by examiner

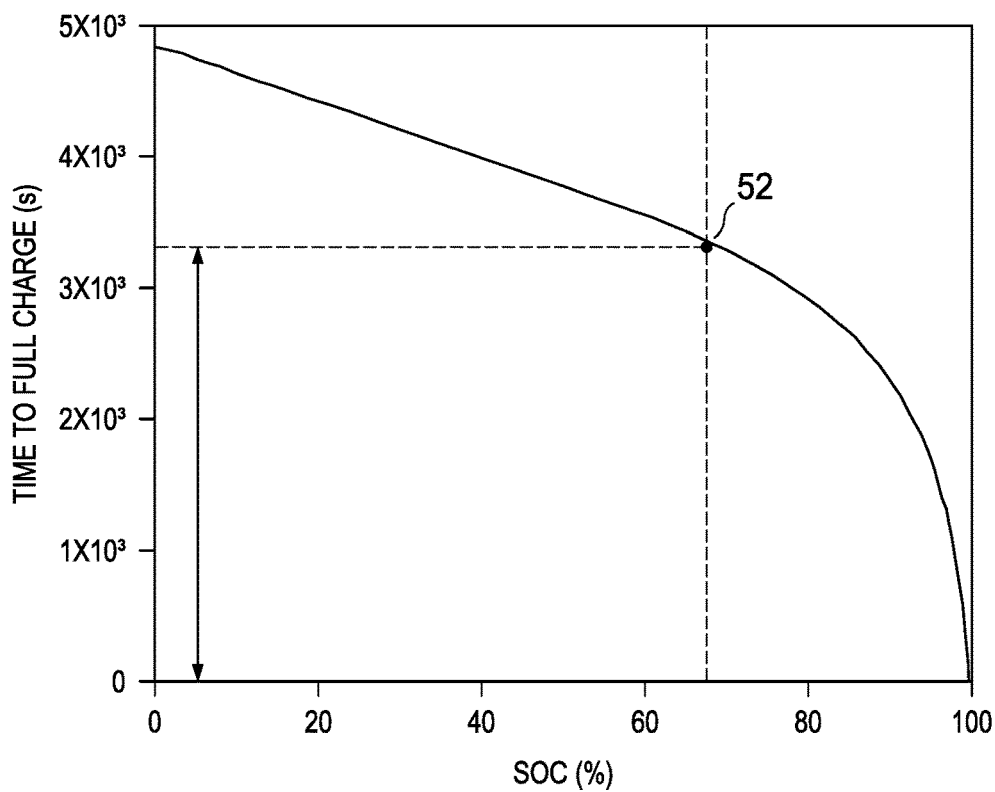
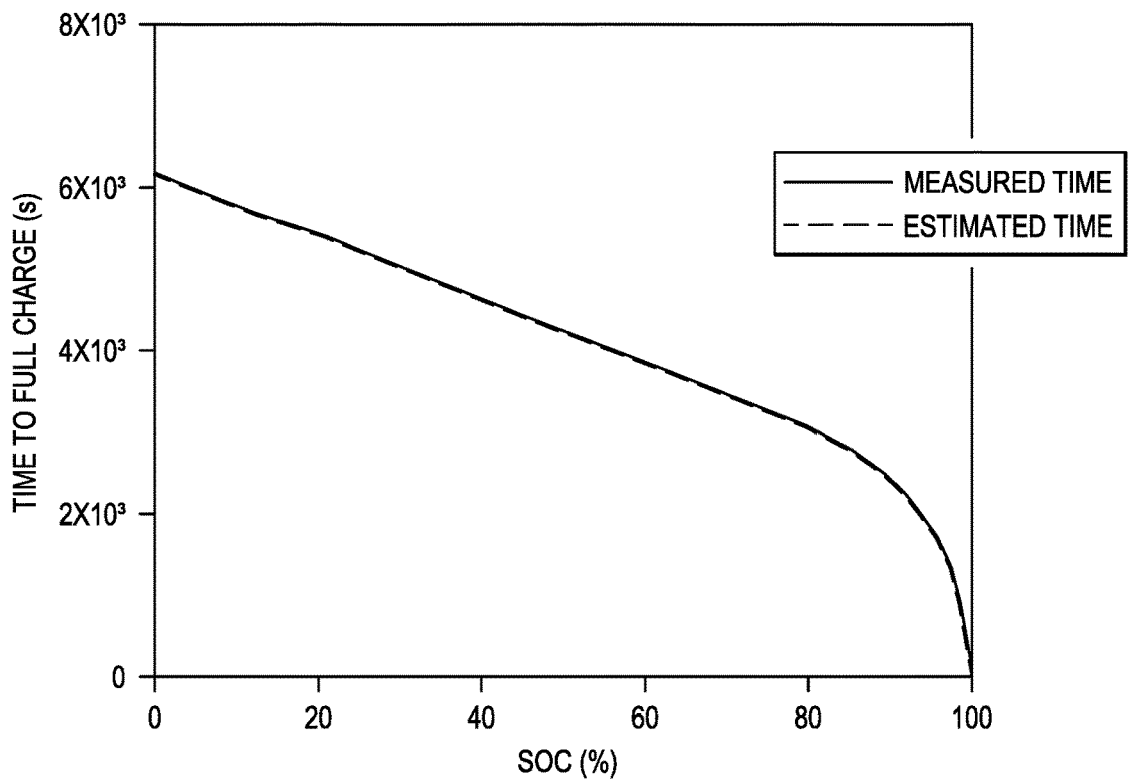

BATTERY CHARGER

CROSS REFERENCE TO RELATED APPLICATIONS

Under 35 U.S.C. § 120, this continuation application claims benefits of and priority to U.S. patent application Ser. No. 13/790,966 (TI-71488), filed on Mar. 8, 2013, the entirety of which are hereby incorporated herein by reference.

TECHNICAL FIELD

This disclosure relates to a battery charger. More particularly, this disclosure relates to a battery charger that includes a charger controller.

BACKGROUND

Portable electronic devices are powered by batteries that generate a voltage based on chemical reactions. As a battery provides power to the portable electronic device, the ability of the battery to provide the power becomes diminished. Many batteries that power portable electronic devices are rechargeable. However, charging such batteries can form deposits inside an electrolyte of the battery that can inhibit ion transport thereby increasing the battery's internal resistance. The increase in internal resistance reduces the cell's ability to deliver current. Thus, recharging the battery can diminish the battery's total capacity.

SUMMARY

One example relates to battery charger that includes a charger controller configured to determine a total charge time that characterizes a time needed to charge a battery. The total charge time can be based on a received state of charge (SOC) of the battery that characterizes a present SOC of the battery. The charger controller can also be configured to determine a charging start time for the battery based on a present time, a predetermined full charge time and the total charge time.

Another example relates to a non-transitory machine readable medium having instructions for performing a method. The method can include determining a total charge time of a battery based on a received SOC of the battery that characterizes a present SOC of the battery. The total charge time of the battery can also be based on a battery time constant of the battery that characterizes the product of a resistance and a capacitance of an equivalent circuit of the battery. The method can also include delaying a charging of the battery until a charging start time that is based on the total charge time and a predetermined full charge time.

Yet another example relates to a battery charging system that includes a battery pack that includes a battery. The battery charging system can also include a battery gauge configured to determine a present state of charge (SOC) of the battery. The battery charging system can further include a battery charger configured to provide a charging signal to the battery pack. The battery charger can include a charger controller configured to determine a constant current-constant voltage transition point for the battery based on a battery time constant and a full charge capacity of the battery. The battery time constant can characterize the product of a resistance and a capacitance of an equivalent circuit of the battery. The charger controller can also be configured to determine a total charge time for the battery based on the present SOC of the battery, the battery time constant and the full charge capacity of the battery. The charger controller can further be configured to determine a charging start time based on the total charge time and a predetermined full charge time. The charger controller can still further be configured to control the charging signal such that the present SOC of the battery prior to the charging start time is maintained and the present SOC of the battery is increased after the charging start time such that the present SOC of the battery is about 100% at the predetermined full charge time.

BRIEF DESCRIPTION OF THE DRAWINGS

FIG. 2 illustrates an example a graph that depicts a time to full charge of a battery plotted as a function of a state of charge of a battery.

FIG. 3 illustrates an example of a graph that depicts experimental results of a time to full charge plotted as a function of a state of charge of a battery.

DETAILED DESCRIPTION

A battery charger can include a charger controller that can control how and when a battery is charged. In particular, upon connecting the battery charger to an external power source (e.g., a power outlet), the charger controller can delay a charging of the battery until after a charging start time is reached. The charging start time can be determined from a predetermined full charge time and a total charge time for the battery. In this manner, the time the battery is at or near a full charge state can be reduced, which can extend a life of the battery.

Figure 1:
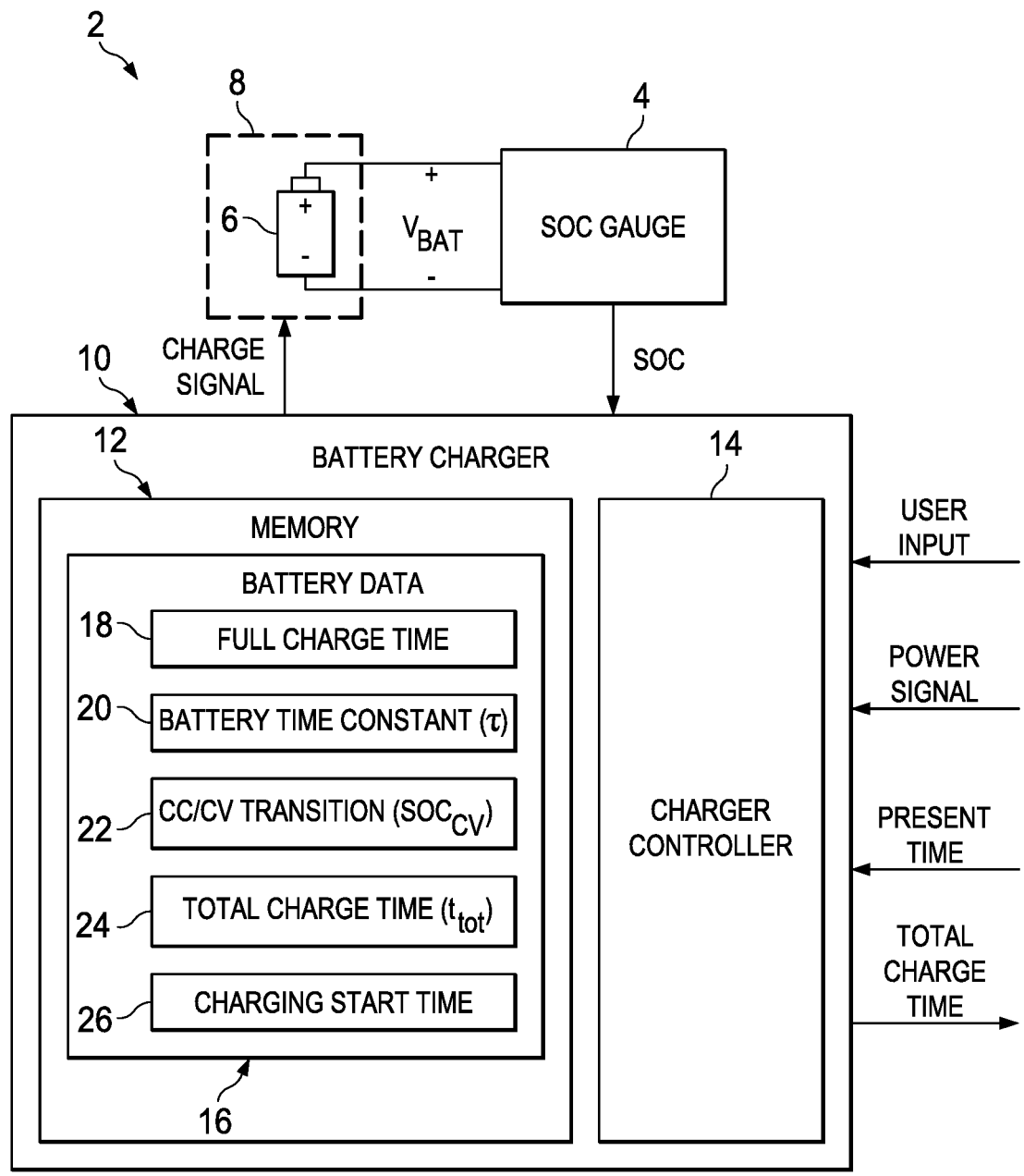
FIG. 1 illustrates an example of a battery charging system.

FIG. 1 illustrates an example of a battery charging system 2. The battery charging system 2 can include a battery gauge 4 that can determine a state of charge (SOC) of a rechargeable battery, which can be simply referred to as a battery 6. The battery charging system 2 could be employed for example, in a wireless phone, a smartphone, a laptop computer, a tablet computer, an automobile (e.g., an electric automobile) or nearly any portable device that needs electrical power to operate.

In some examples, the battery gauge 4 can be integrated with a battery pack 8 that stores the battery. In other examples, the battery gauge 4 can be separate from the battery pack 8. The SOC of the battery 6 can change in real time (or near real-time). To determine the SOC of the battery 6, the battery gauge 4 can be configured to continuously sample a voltage $V_{BAT}$ of the battery 6 at each of a plurality of sampling periods to provide the SOC of the battery 6 at each of the sampling periods based on the voltage $V_{BAT}$, a temperature of the battery 6, predetermined data associated with steady-state and transient behaviors of the battery 6 relative to a depth of discharge (DOD) of the battery 6. In the example of FIG. 1, the battery 6 is demonstrated as a single battery. However, it is to be understood that the battery 6 can represent a plurality of batteries (or battery cells) electrically connected in series, such that the voltage $V_{BAT}$ could represent an aggregate voltage of all of the batteries. Therefore, the SOC calculated by the battery gauge 4 can be an average SOC of the plurality of batteries.

The SOC of the battery 6 can be provided to a battery charger 10. In some examples, the battery charger 10 can be implemented, for example, as hardware (e.g., an integrated circuit (IC) chip) coupled to discrete circuit components. In some examples, the battery charger 10 (or some components thereof) can be implemented as machine readable instructions stored in a non-transitory computer readable medium, such as a memory 12 wherein a processing unit (e.g., a processor core) can access the memory 12 and execute the machine readable instructions. In still other examples, the battery charger 10 can be implemented as a combination of hardware and software, such as firmware.

Upon connecting (e.g., "plugging in") the battery charging system 2 to a power source (e.g., an external power source), the battery charger 10 can receive a power signal (labeled in FIG. 1 as "POWER SIGNAL"). As one example, the power source could be a 110 Volt (V) power source or a 220 V power source (e.g., an electrical outlet). In another example, the power source could be a 5 V direct current (DC) power source (e.g., a universal serial bus (USB) connection). The power signal can be a signal that corresponds to a signal provided at the power source. For instance, in some examples, the power signal can be a stepped down and rectified version of the signal provided by the power source (e.g., a 12 V DC signal). In other examples, the power signal could be a pass through of the signal at the power source (e.g., a 5 V DC signal). At or near time a of connecting the battery charger 10 to the external power source, an initial SOC of the battery 6 can be received (labeled in FIG. 1 as "SOC"). Such an initial SOC can represent a present SOC of the battery ($SOC_p$) at the time of the connection.

The battery charger 10 can provide and control a charge signal (labeled in FIG. 1 as "CHARGE SIGNAL") to the battery 6 via the battery pack 8. In response to the charge signal, the battery 6 can be charged at a predetermined rate. Moreover, the battery gauge 4 can provide the SOC of the battery 6 as feedback for the charge signal. As explained herein, by controlling the charge signal, the SOC of the battery 6 can be increased up to about 100%. At an SOC of about 100%, the battery 6 can be considered to be in a fully charged state. Moreover, the battery 6 can have a full charge capacity (FCC) of the battery 6 that can initially be approximately equal to an SOC of about 100% for the battery 6. However, as the capacity of the battery 6 degrades over time (due to repeated charging), the difference between an SOC of about 100% for the battery 6 and the FCC of the battery 6 can increase. The FCC of the battery 6 can be a predetermined, measured value in milliamps per hour (mA/h).

The battery 6 charge signal can be controlled by a charger controller 14 of the battery charger 10. In some examples, the charger controller 14 can be implemented, for example, as an IC chip, such as an application specific integrated circuit (ASIC) chip. In other examples, the charger controller 14 could be implemented as a microcontroller with embedded instructions (e.g., firmware). In still other examples, the charger controller 14 can include a processing unit (e.g., a processor core) and a non-transitory machine readable medium such as the memory 12 that stores machine executable instructions. In such a situation, the memory 12 could be implemented as volatile memory (e.g., random access memory (RAM)), non-volatile memory (e.g., a solid state drive, flash memory, a hard disk drive, etc.) or a combination thereof. Moreover, in such an example, the processing unit can access the memory 12 and execute the machine readable instructions.

For many batteries, such as a lithium ion battery, the more time that the battery 6 is at an SOC of about 100% (e.g., at or near FCC of the battery 6), the total capacity of the battery 6 degrades. For instance, if the battery 6 is kept at or near an SOC of about 100%, the battery's 6 charging capacity will degrade faster than if the battery 6 is kept at an SOC of about 50%. Thus, the battery charger 10 can be configured to limit a percentage of time that the battery 6 is kept at or near an SOC of about 100%, thereby extending the life (e.g., reducing the degradation rate of the battery 6).

The battery charger 10 can include battery data 16 that can characterize information about the battery 6. The battery data 16 can be stored, for example, in the memory 12. The battery data 16 can include a full charge time 18 for the battery 6. The full charge time 18 can be a time of day that the battery 6 is to be at or near a SOC of about 100%. In some examples, the full charge time 18 can be set, for example, in response to user input (labeled in FIG. 1 as "USER INPUT"). For instance, in examples where the battery charger 10 is implemented on a smartphone, the user can set a full charge time 18 via a graphical user interface (GUI). In a given example, the full charge time 18 of the battery 6 can be set to 7:00 A.M. Moreover, in the given example, the full charge time 18 can be representative of a time in the morning that a portable electronic device (e.g., a wireless phone) would typically need to be at a fully charged state (e.g., the start of a work day). In some examples, the user input can set the full charge time 18 to a setting that indicates that the battery 6 is to be charged immediately.

The battery 6 can have an equivalent circuit that can be modeled as a resistor in series with a capacitor. The battery data 16 can also include a battery time constant ($\tau$) 20 that can characterize the product of the resistance and the capacitance of the equivalent circuit (e.g., an RC time constant for the battery 6). In some examples, the battery time constant ($\tau$) 20 can be derived from experimental data employed to generate the equivalent circuit of the battery 6. In some examples, the battery time constant ($\tau$) 20 can be a fixed value that can be based on physical properties of the battery 6. In other examples, the battery time constant ($\tau$) 20 can vary as a function of a temperature of the battery 6.

The charge signal provided to the battery charger 10 can have three different states. In a first state, the charge signal can maintain the SOC of the battery 6 at the present SOC ($SOC_p$). Thus, in the first state, the charge signal is provided with a current that can maintain the SOC of the battery 6, but does not significantly increase the SOC of the battery 6. As an example, in the first state, the charge signal can be provided intermittently, such that the SOC of the battery 6 increases by a relatively small amount (e.g., about 2% or less), and then the charge signal is terminated until the SOC of the battery 6 returns to the previous SOC. In this manner, the battery 6 charging system 2 can ensure that the SOC of the battery 6 does not decrease when the battery charger 10 is connected to a power source.

Additionally, in a second state, the charge signal can be provided at a constant current. Moreover, at some point in time, the charge signal can switch to a third state that provides a constant voltage. The switch between the second state and the third state of the charge signal can be referred to as a constant current-constant voltage (CC/CV) transition point 22, which can be a specific SOC of the battery 6. To determine the CC/CV transition point 22, the charger controller 14 can employ Equation 1.

$$SOC_{cv}(\tau) = \frac{FCC - \tau(I_{st} - I_{tap})}{FCC} \qquad \text{Equation 1}$$

wherein:
- τ is the battery time constant 20 for the battery 6;
- $SOC_{CV}$ is the SOC of the battery 6 at the CC/CV transition point 22;
- $I_{st}$ is the constant current provided during the second state of the charge signal;
- $I_{tap}$ is a tapper current provided after termination of a charging of the battery 6; and
- FCC is the full charge capacity of the battery 6.

In some examples, the values of the constant current the second state ($I_{st}$) and the taper current ($I_{tap}$) can be fixed parameters of the battery charger 10. The charger controller 14 can store the CC/CV transition point 22 in the battery data 16. Additionally, Equation 2 can characterize an amount of time to provide the charge signal (at a constant current) in the second state until the CC/CV transition point 22 is reached.

$$t_{cc}(SOC_p, t) = \frac{FCC(1 - SOC_p) - \tau(I_{st} - I_{tap})}{I_{st}} \qquad \text{Equation 2}$$

wherein:
- $t_{cc}$, is the time remaining (in seconds) for providing the charge signal at the second state (e.g., at a constant current) before the CC/CV transition point 22 is reached; and
- $SOC_p$ is a present value of the SOC of the battery 6.

Further, Equation 3 can characterize an amount of time to provide the charge signal at the third state (e.g., at a constant voltage) after the CC/CV transition point 22 is reached.

$$t_{cv}(SOC_p, \tau) = \tau\left(ln\left(\frac{FCC - FCC*SOC_p + I_{tap}*\tau}{I_{st}*\tau}\right) - ln\left(\frac{1}{I_{st}}*I_{tap}\right)\right) \qquad \text{Equation 3}$$

wherein:
- $t_{cv}$ is the time remaining (in seconds) for providing the charge signal the third state before the SOC of the battery 6 is about 100%.

FIG. 2 illustrates an example of a graph 50 that plots a time to full charge (e.g., an amount of time needed to reach about 100% SOC of the battery 6) as a function of an SOC of the battery 6 illustrated in FIG. 1. Moreover, a point 52 on the graph can represent the CC/CV transition point of the battery 6. That is, in the present example, the CC/CV transition point 52 can occur when the SOC of the battery 6 reaches about 68%, which can correspond to a time to full charge of about 3.3×10³ seconds (about 55 minutes). Moreover, at an SOC before the CC/CV transition point 52, the charge signal can be provided in the second state (e.g., at a constant current), and the SOC of the battery 6 and the time to full charge of the battery 6 have a substantially linear relationship. After the CC/CV transition point 52, the charge signal can be provided in the third state (e.g., at a constant voltage) and the SOC of the battery 6 and the time to full charge of the battery have a substantially non-linear relationship (e.g., a logarithmic relationship).

Referring back to FIG. 1, Equation 2 can be employed to determine a total time that the charge signal is provided in the second state (e.g., at constant current) when the SOC of the battery 6 is initially at 0%, which can result in Equation 5. Additionally, Equation 3 can be employed to determine a total time that the charge signal is provided in the third state (e.g., at constant voltage) when the SOC of the battery 6 is at or near the CC/CV transition point 22, which can result in Equation 6.

$$t_{cc}(0\%, \tau) = \frac{FCC - \tau(I_{st} - I_{tap})}{I_{st}} \qquad \text{Equation 5}$$

$$t_{cv}(SOC - CV, \tau) = t_{tap} = -\tau\left(ln\left(\frac{1}{I_{st}}*I_{tap}\right)\right) \qquad \text{Equation 6}$$

wherein:
- $t_{tap}$ is the remaining charge time from the CC/CV transition point 22 to an SOC for the battery 6 of about 100%.

By solving Equation 3 for the battery time constant (τ) 20, Equation 7 can be derived.

$$\tau = \frac{FCC(1 - SOC_{st}) - I_{st}*t_{last}}{I_{st} - I_{tap} + I_{st}*ln\left(\frac{I_{tap}}{I_{st}}\right)} \qquad \text{Equation 7}$$

wherein:
- $t_{last}$ is a measured charging time for charging the battery 6 from a starting SOC of the battery 6 ($SOC_{st}$) to an SOC of about 100%; and
- $SOC_{st}$ is less than $SOC_{cv}$.

Accordingly, by measuring the total charge time ($t_{tot}$) 24 and employing Equation 7, in some examples, the charger controller 14 can determine the battery time constant (τ) 20, which can be stored in the battery data 16. In some examples, the battery time constant (τ) 20 can be an average of multiple battery time constants (τ) derived from Equation 7. Additionally, in some examples, the battery time constant (τ) 20 can be updated in the battery data 16 by the charger controller 14 after completing a full charging of the battery 6 by employing Equation 7.

Furthermore, Equations 1, 2 and 3 can be combined to derive Equation 8, such that a total charge time ($t_{tot}$) 24 can be calculated (e.g., by the charger controller 14) from the present SOC of the battery 6 ($SOC_p$).

$$t_{tot}(SOC_p, \tau) = \begin{cases} t_{cv}(SOC_p, \tau), & SOC_p \geq SOC - CV \\ t_{cc}(SOC_p, \tau) - \tau*ln\left(\frac{I_{tap}}{I_{st}}\right), & SOC_p < SOC - CV \end{cases} \qquad \text{Equation 8}$$

wherein:
- $t_{tot}$ is the total charge time 24 from the present SOC of the battery 6 ($SOC_p$) to a SOC for the battery 6 of about 100%.

By employing substitution, Equation 8 can be expanded to derive Equation 9.

$$t_{tot}(SOC_p, \tau) = \begin{cases} \tau\left(\ln\left(\dfrac{FCC - FCC*SOC_p + I_{tap}*\tau}{I_{st}*\tau}\right) - \ln\left(\dfrac{1}{I_{st}}*I_{tap}\right)\right), \\ \qquad SOC_p \geq SOC - CV \\ \dfrac{FCC(1 - SOC_p) - \tau(I_{st} - I_{tap})}{I_{st}} - \tau*\ln\left(\dfrac{I_{tap}}{I_{st}}\right), \\ \qquad SOC_p < SOC - CV \end{cases} \quad \text{Equation 9}$$

Accordingly, the charger controller 14 can calculate the total charge time ($t_{tot}$) 24 by employing Equation 9 in response to receiving the present SOC for the battery 6 ($SOC_p$). The charger controller 14 can store the total charge time ($t_{tot}$) 24 in the battery data 16. Additionally, in some examples, the charger controller 14 can output a total charge time signal (labeled in FIG. 1 as "TOTAL CHARGE TIME") to an external system (e.g., a host system). The total charge time signal can include data that characterizes the total charge time ($t_{tot}$) 24 such that the external system can implement further processing of the total charge time ($t_{tot}$) 24. In such a situation, the total charge time signal can be provided to the external system over a bus, such as the Inter-Integrated Circuit ($I^2C$) bus coupled to the battery charger 10.

The charger controller 14 can determine a charging start time 26 based on the total charge time ($t_{tot}$) 24 and the full charge time 18. To determine the charging start time 26, the charger controller 14 can subtract the total charge time ($t_{tot}$) 24 from the full charge time 18. For instance, in the given example where the full charge time 18 is 7:00 A.M., and the total charge time ($t_{tot}$) 24 is determined to be about 1.5 hours, the charging start time 26 can be set to about 5:30 A.M. The charging start time 26 can be stored, for example, in the battery data 16.

Additionally, the battery charger 10 can receive a present time signal (labeled in FIG. 1 as "PRESENT TIME") that characterizes a present time. In some examples, the present time signal could be provided from an external source (e.g., a telecommunications tower or a network server). In other examples, the present time signal could be provided from an internal component (e.g., an internal clock). The charger controller 14 can cause the battery charger 10 to provide the charge signal in the first state to maintain the present SOC ($SOC_P$) of the battery 6 from the present time until the present time is the same (or nearly the same) as the charging start time 26. Accordingly, the charger controller 14 can cause the battery charger 10 to delay charging the battery 6 until the charging start time 26. At (or after) the charging start time 26, the charger controller 14 can cause the battery charger 10 to charge the battery 6 in a manner described herein.

At the charging start time 26, if the present SOC ($SOC_P$) of the battery 6 is less than the CC/CV transition point 22, the charger controller 14 can cause the battery charger 10 to provide the charge signal in the second state (e.g., at a constant current) until the CC/CV transition point 22 is reached. Moreover, upon reaching the CC/CV transition point 22, the charger controller 14 can cause the battery charger 10 to change the charge signal from the second state (e.g., at a constant current) to the third state (e.g., at a constant voltage). If the present SOC ($SOC_P$) of the battery 6 is greater than or equal to the CC/CV transition point 22, the charger controller 14 can cause the battery charger 10 to provide the charge signal in the third state until the SOC of the battery 6 reaches a fully charged state of about 100%. Upon reaching the fully charged state, the charger controller 14 can cause a battery charger 10 to provide the charge signal in the first state to maintain charge of the battery 6 at the fully charged state of about 100% until the power signal is ceased, which can indicate that the battery charger 10 has been disconnected from the power source (e.g., unplugged).

By employing the battery charging system 2, the time at which the battery 6 is at or near the fully charged state of about 100% can be reduced. Such a reduction can slow a degradation of the charging capacity of the battery 6. In this manner, the benefits of having a fully charged battery can be achieved at a desired full charge time 18 that can be specified without the consequences (e.g. battery capacity degradation) of having the battery 6 at the fully charged state for an excessive amount of time. Furthermore, prior to the charging start time 26, the SOC of the battery 6 is maintained, but not significantly increased. Accordingly, upon connecting the battery charger 10 to the power source, the SOC of the battery 6 does not decrease such that a user could, in some examples, employ the portable device associated with the battery 6 while the battery charger 10 is connected to the power source.

Moreover, the derived Equations 1-9 are relatively simple and the variables (e.g., parameters) for the Equations 1-9 are easily obtained such that the battery charger 2 can be implemented relatively easily and without advanced mathematical techniques (e.g., curve fitting). Furthermore, since the battery charger 10 switches from the charging signal from the second state (e.g., a constant current) to the third state (e.g., a constant voltage) at the transition point, the battery 6 can be charged at an optimal rate, which can be referred to as a "healthy rate" that does not damage or degrade the battery 6. In comparison, some conventional battery chargers simply charge batteries at a fastest possible rate (e.g., not the optimal rate) thereby degrading a charge capacity of the battery.

Figure 4:
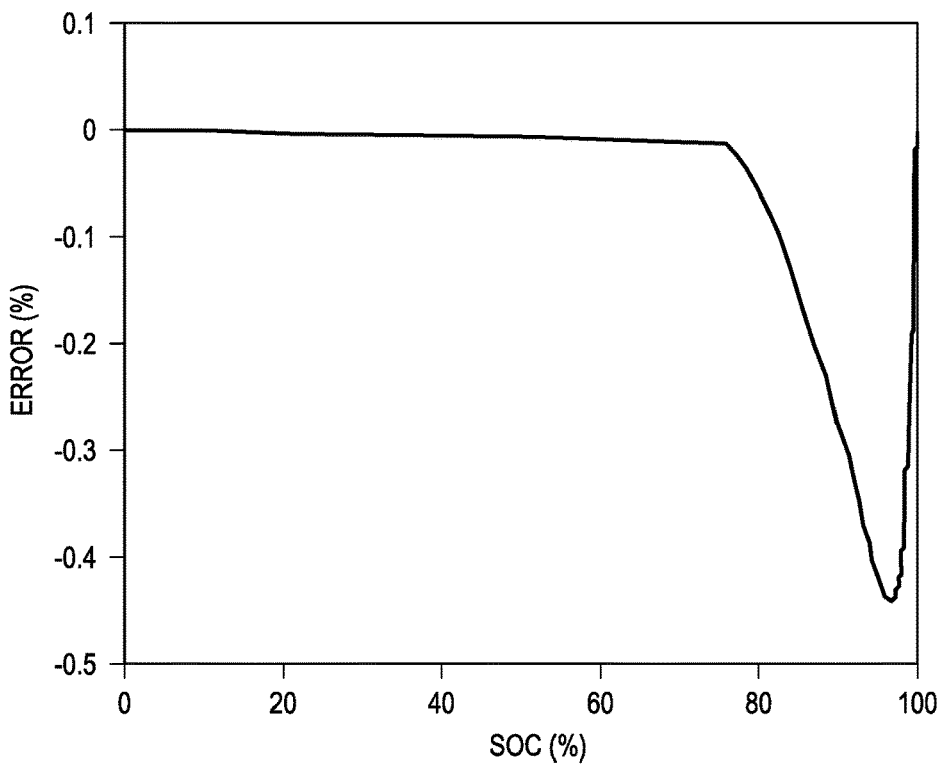
FIG. 4 illustrates a graph that plots an error of the plots in FIG. 3 as a function of a state of charge of a battery.
Figure 5:
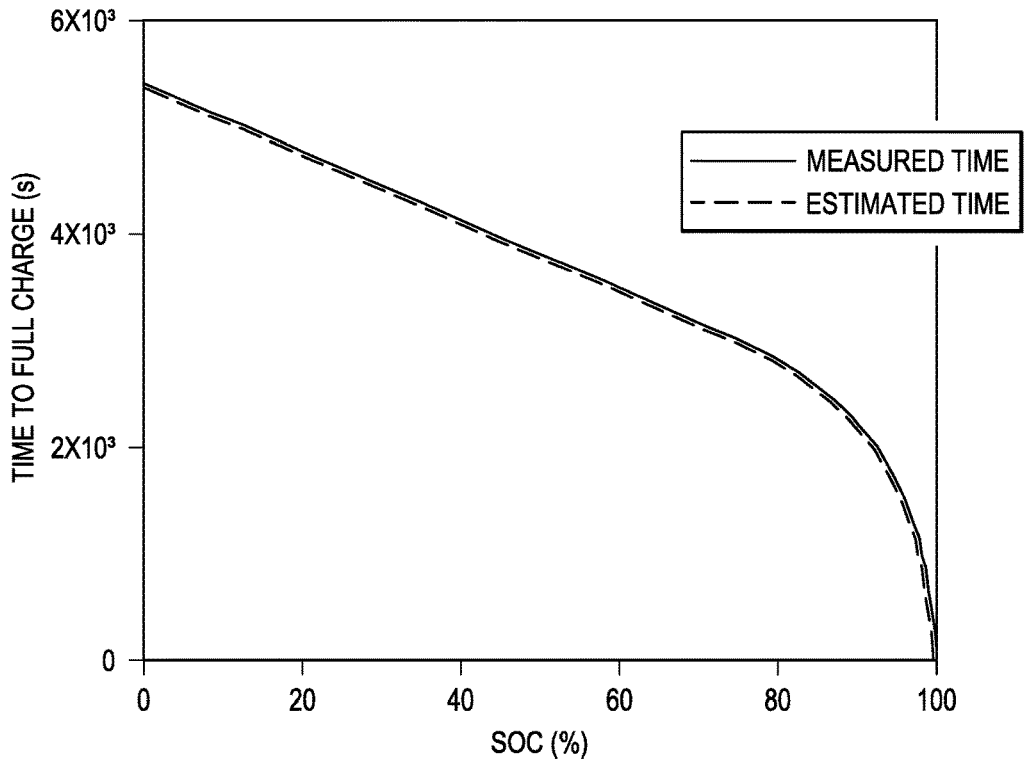
FIG. 5 illustrates another example of a graph that depicts experimental results of a time to full charge plotted as a function of a state of charge of a battery.
Figure 6:
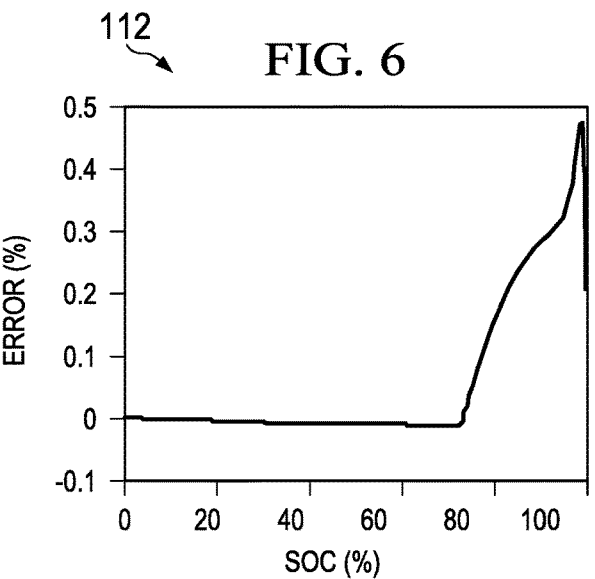
FIG. 6 illustrates a graph that plots an error of the plots in FIG. 5 as a function of a state of charge of a battery
Figure 7:
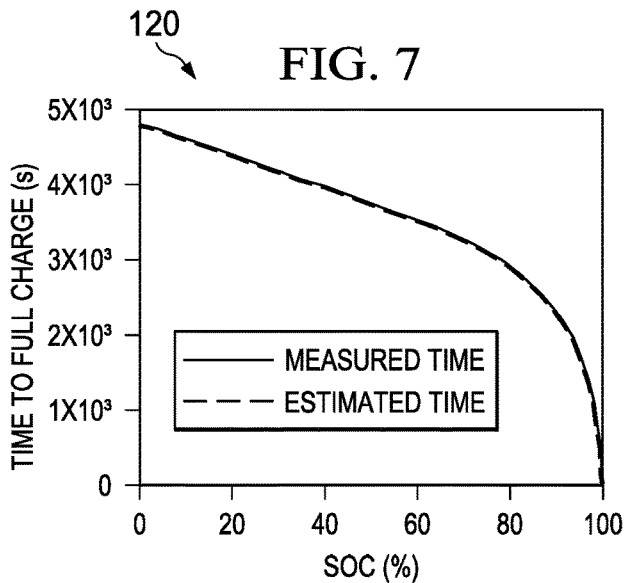
FIG. 7 illustrates yet another example of a graph that depicts experimental results of a time to full charge plotted as a function of a state of charge of a battery.

FIGS. 3-8 depict experimental data derived from observation of charging a battery. In particular, FIGS. 3, 5 and 7 illustrate graphs 100, 110 and 120 that depict experimental data that plots a time to full charge as a function of an SOC of a battery (e.g., the battery 6 illustrated in FIG. 1). In FIGS. 3, 5 and 7, two plots are illustrated, a first plot depicts a time to full charge (labeled in FIGS. 3, 5 and 7 as "MEASURED TIME") that characterizes an experimentally measured amount of time to charge the battery. A second plot depicts an estimated time to full charge (labeled in FIGS. 3, 5 and 7 as "ESTIMATED TIME") that characterizes a time to full charge estimated for the battery with an SOC of about 0%, wherein the estimated time to full charge is based on Equation 9. Moreover, in Equation 9, a battery time constant for the battery is calculated using Equation 7. In FIG. 3, to charge the battery, a constant current is applied to the battery at a rate to fully charge the battery in one hour, which can be referred to as a rate of about 1 C. In FIG. 5, to charge the battery, a constant current is applied to the battery at a rate of about 1.2 C, which would be about 20% more current than the charge rate of 1 C. In FIG. 7, to the charge the battery, a constant current is applied to the battery at a rate of about 1.8 C, which would be about 80% more current than the charge rate of 1 C.

Figure 8:
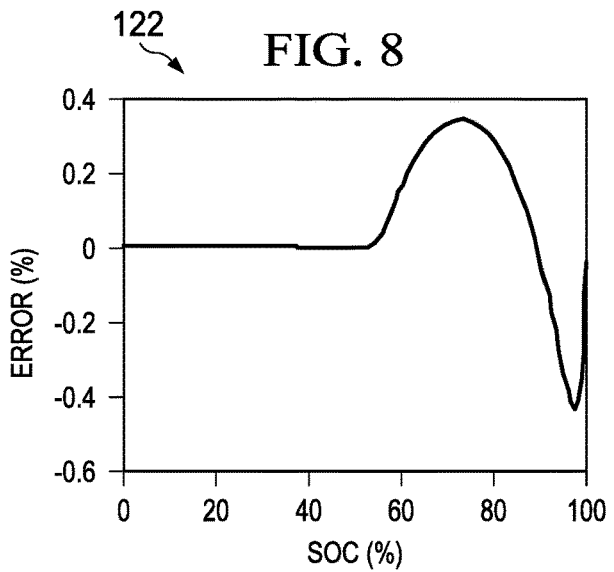
FIG. 8 illustrates a graph that plots an error of the plots in FIG. 7 as a function of a state of charge of a battery.

FIGS. 4, 6 and 8 illustrate graphs 102, 112 and 122 that illustrate an error percentage (%) plotted as a function of the SOC of the battery. In FIG. 4, the error percentage corresponds to the difference between the first and second plots in FIG. 3. In FIG. 6, the error percentage corresponds to the difference between the first and second plots in FIG. 5. In FIG. 8, the error percentage corresponds to the difference between the first and second plots in FIG. 7. As illustrated in FIGS. 3-8, by employing Equations 7 and 9, the estimated time for charging the battery can have a high degree of accuracy (less than 0.5% error). Moreover, as illustrated in FIGS. 4, 6 and 8, the error percentage tends toward 0% at as the SOC of the battery approaches 100%.

Figure 9:
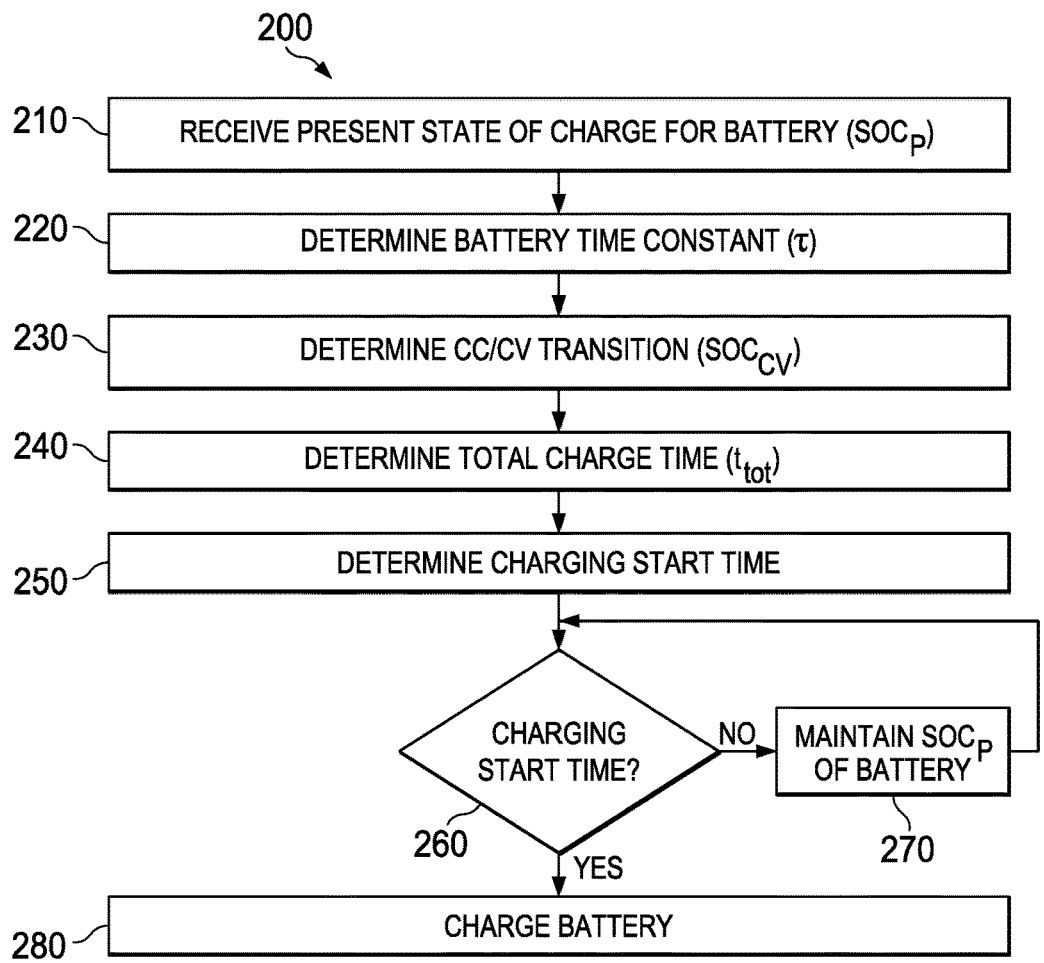
FIG. 9 illustrates a flowchart of an example method for charging a battery.
Figure 11:
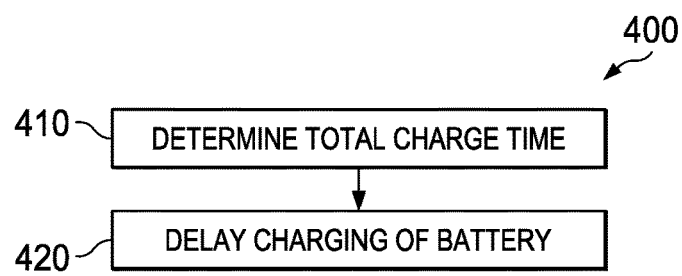
FIG. 11 illustrates another example of a flowchart of an example method for charging a battery.

In view of the foregoing structural and functional features described above, example methods will be better appreciated with reference to FIGS. 9 and 11. While, for purposes of simplicity of explanation, the example methods of FIGS. 9 and 11 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIGS. 9 and 11 can be implemented as instructions stored in a non-transitory machine-readable medium. The instructions can be accessed by a processing resource and executed to perform the methods disclosed herein.

FIG. 9 illustrates a flow chart of an example method 200 for charging a battery. The method 200 could be implemented, for example, by the battery charging system 2 illustrated in FIG. 1. At 210, upon detecting a power signal, a battery charger (e.g., the battery charger 10 illustrated in FIG. 1) can receive an initial SOC for a battery (e.g., the battery 6 illustrated in FIG. 1) from a battery gauge (e.g., the battery 4 illustrated in FIG. 1). The initial SOC for the battery can be referred to as the present SOC for the battery ($SOC_p$). At 220, a charger controller (e.g., the charger controller 14 illustrated in FIG. 1) of the battery charger can determine a battery time constant ($\tau$) for the battery. The battery time constant ($\tau$) can be determined, for example, by employment of Equation 7.

At 230, the charger controller can determine a CC/CV transition point ($SOC_{CV}$) for the battery. To determine the CC/CV transition point ($SOC_{CV}$), the charger controller can employ, for example, Equation 1. At 240, the charger controller can determine a total charge time ($t_{tot}$) for the battery. To determine the total charge time ($t_{tot}$), the charger controller can employ, for example, Equation 9.

At 250, the charger controller can determine a charging start time. To determine the charging start time, the charger controller can examine a stored full charge time and subtract the total charge time from the full charge time. For instance, if the full charge time is 9:30 A.M. and the total charge time is about 2 hours and 20 minutes, the charging start time can be about 7:10 A.M.

At 260, the charger controller can make a determination as to whether a present time is at (or past) the charging start time. If the determination at 260 is negative (e.g., NO), the method 200 can proceed to 270. If the determination at 260 is positive (e.g., YES), the method 200 can proceed to 280. At 270, the charger controller can control a charge signal provided by the battery charger to the battery and causes the battery charger to provide the charge signal in a first state, such that the present SOC ($SOC_p$) of the battery is maintained, but not significantly increased. At 280, the charger controller can cause the battery charger to provide the charge signal in a second state (e.g., a constant current) or third state (e.g., a constant voltage) to charge the battery until the SOC of the battery reaches about 100%. By employment of this method, the amount of time that the battery is at or near an SOC of about 100% is reduced, since the charging of the battery is delayed until the charging start time is reached.

Figure 10:
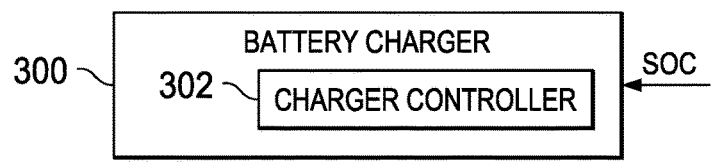
FIG. 10 illustrates an example of a battery charger.

FIG. 10 illustrates an example of a battery charger 300. The battery charger 300 could be employed to implement the battery charger 10 illustrated in FIG. 1. The battery charger 300 can include a charger controller 302 that can be configured to determine a total charge time ($t_{tot}$) that characterizes a time needed to charge a battery. The total charge time can be based on a received SOC (labeled in FIG. 10 as "SOC") of the battery that characterizes a present SOC of the battery. The battery charger can also determine a charging start time for the battery based on a predetermined full charge time and the total charge time.

FIG. 11 illustrates an example of a method 400 for charging a battery. The method 400 could be implemented, for example, by the charger controller 14 illustrated in FIG. 1. At 410, a total charge time ($t_{tot}$) of a battery can be determined (e.g., by the charger controller) based on a received state of charge (SOC) of the battery that characterizes a present SOC of the battery and the total charge time ($t_{tot}$) of the battery can also be based on a battery time constant ($\tau$) of the battery that characterizes the product of a resistance and a capacitance of an equivalent circuit of the battery. At 420, a charging of the battery can be delayed (e.g., by the charger controller) until a charging start time that is based on the total charge time ($t_{tot}$) and a predetermined full charge time.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A battery charger comprising:
   a memory storing battery parameters, including a battery time constant and a present state of charge of a battery; and
   a controller coupled to the memory, and configured to:
   determine a transitional state of charge based on a difference between a predetermined current and a taper current, a full charge capacity, the battery time constant, and the present state of charge;
   determine a total charge time based on the battery time constant, the present state of charge, and the transitional state of charge;
   determine a charging start time based on the total charge time;
   maintain the battery at the present state of charge below the full charge capacity of the battery before the charging start time;
   generate a first signal associated with the predetermined current to charge the battery after the charging start time and before the battery reaches the transitional state of charge; and
   generate a second signal associated with a predetermined voltage to charge the battery after the battery reaches the transitional state of charge.

2. The battery charger of claim 1, wherein the first signal causes the predetermined current to be supplied for charging the battery after the charging start time and before the battery reaches the transitional state of charge.

3. The battery charger of claim 1, wherein the second signal causes the predetermined voltage to be supplied for charging the battery after the battery reaches the transitional state of charge.

4. The battery charger of claim 1, wherein the present state of charge is received from a gauge coupled to the battery, and the present state of charge is below the full charge capacity when received.

5. The battery charger of claim 1, wherein the controller is configured to maintain the battery at the present state of charge by providing a charging signal to increase the present state of charge by 2% or less, and terminating the charging signal when the battery returns to the present state of charge.

6. The battery charger of claim 1, wherein the battery comprises a lithium ion battery.

7. The battery charger of claim 1, wherein the controller is configured to determine the battery time constant based on the full charge capacity and the predetermined current.

8. The battery charger of claim 1, wherein the battery time constant representative of a product of a resistance and a capacitance of an equivalent circuit for the battery.

9. The battery charger of claim 1, wherein the controller is configured to update the battery time constant at a charge termination time according to:

$$\tau = \frac{FCC(1 - SOC_{st}) - I_{st} * \tau_{last}}{I_{st} - I_{tap} + I_{st} * \ln\left(\frac{I_{tap}}{I_{st}}\right)}$$

in which:
  $\tau$ is the battery time constant for the battery;
  $I_{st}$ is a constant current provided to the battery during a charging of battery;
  $I_{tap}$ is the taper current provided after termination of a charging of the battery;
  FCC is the full charge capacity of the battery; and
  $t_{last}$ is a measured charging time for charging the battery from a starting SOC ($SOC_{st}$) to an SOC of about 100%.

10. The battery charger of claim 1, wherein the controller is configured to determine the total charge time according to:

$$t_{tot}(SOC_p, \tau) = \begin{cases} \tau\left(\ln\left(\frac{FCC - FCC*SOC_p + I_{tap}*\tau}{I_{st}*\tau}\right) - \ln\left(\frac{1}{I_{st}} * I_{tap}\right)\right), \\ \quad SOC_p \geq SOC - CV \\ \frac{FCC(1 - SOC_p) - \tau(I_{st} - I_{tap})}{I_{st}} - \tau * \ln\left(\frac{I_{tap}}{I_{st}}\right), \\ \quad SOC_p < SOC - CV \end{cases}$$

in which:
  $t_{tot}$ is the total charge time of the battery;
  $\tau$ is the battery time constant for the battery;
  $I_{st}$ is a constant current provided to the battery during a charging of the battery;
  $I_{tap}$ is the taper current provided after termination of a charging of the battery;
  FCC is the full charge capacity of the battery;
  $SOC_p$ is the present state of charge of the battery; and
  $SOC_{CV}$ is the transitional state of charge of the battery.

11. A battery charger comprising:
  a memory storing battery parameters, including a battery time constant and a present state of charge of a battery; and
  a controller coupled to the memory, and configured to:
    determine a transitional state of charge based on a difference between a predetermined current and a taper current, a full charge capacity, the battery time constant, and the present state of charge;
    determine a total charge time based on the battery time constant, the present state of charge, and the transitional state of charge;
    determine a charging start time based on the total charge time;
    maintain the battery at the present state of charge below the full charge capacity of the battery before the charging start time;
    generate a pre-transitional state signal associated with the predetermined current to charge the battery after the charging start time and before the battery reaches the transitional state of charge.

12. The battery charger of claim 11, wherein the pre-transitional state signal causes the predetermined current to be supplied for charging the battery after the charging start time and before the battery reaches the transitional state of charge.

13. The battery charger of claim 11, wherein the controller is configured to generate a post-transitional state signal associated with a predetermined voltage to charge the battery after the battery reaches the transitional state of charge.

14. The battery charger of claim 13, wherein the post-transitional state signal causes the predetermined voltage to be supplied for charging the battery after the battery reaches the transitional state of charge.

15. The battery charger of claim 11, wherein the controller is configured to determine the battery time constant based on the full charge capacity and the predetermined current.

16. A battery charger comprising:
  a memory storing battery parameters, including a battery time constant and a present state of charge of a battery; and
  a controller coupled to the memory, and configured to:
    determine a transitional state of charge based on a difference between a predetermined current and a taper current, a full charge capacity, the battery time constant, and the present state of charge;
    determine a total charge time based on the battery time constant, the present state of charge, and the transitional state of charge;
    determine a charging start time based on the total charge time;
    maintain the battery at the present state of charge below the full charge capacity of the battery before the charging start time; and
    generate a post-transitional state signal associated with a predetermined voltage to charge the battery after the battery reaches the transitional state of charge.

17. The battery charger of claim 16, wherein the post-transitional state signal causes the predetermined voltage to be supplied for charging the battery after the battery reaches the transitional state of charge.

18. The battery charger of claim 16, wherein the controller is configured to generate a pre-transitional state signal associated with a predetermined current to charge the battery after the charging start time and before the battery reaches the transitional state of charge.

19. The battery charger of claim 18, wherein the pre-transitional state signal causes the predetermined current to be supplied for charging the battery after the charging start time and before the battery reaches the transitional state of charge.

20. The battery charger of claim 16, wherein the controller is configured to determine the battery time constant based on the full charge capacity and the predetermined current.

* * * * *